United States Patent [19]
Pike et al.

[11] 3,944,947
[45] Mar. 16, 1976

[54] LASER AMPLIFIER SYSTEM

[75] Inventors: Charles T. Pike, Lexington, Mass.; Richard H. Levy, Seattle, Wash.

[73] Assignee: Jersey Nuclear-Avco Isotopes, Inc., Bellevue, Wash.

[22] Filed: Nov. 1, 1974

[21] Appl. No.: 520,047

[52] U.S. Cl. .............................. 331/94.5 D; 330/4.3
[51] Int. Cl.² ........................................... H01S 3/02
[58] Field of Search ...................... 331/94.5; 330/4.3

[56] References Cited
UNITED STATES PATENTS
3,312,905  4/1967  Lewis ............................ 331/94.5 C Primary Examiner—William L. Sikes
Attorney, Agent, or Firm—Weingarten, Maxham & Schurgin

[57] ABSTRACT

A laser amplifier system having plural parallel paths for amplification of laser radiation from a single, stable laser oscillator. The plural paths of laser amplification are excited to produce sequential pulses of amplified output radiation that are interleaved by an optical combining system to produce a single path of amplified, pulsed radiation of increased repetition rate.

21 Claims, 8 Drawing Figures

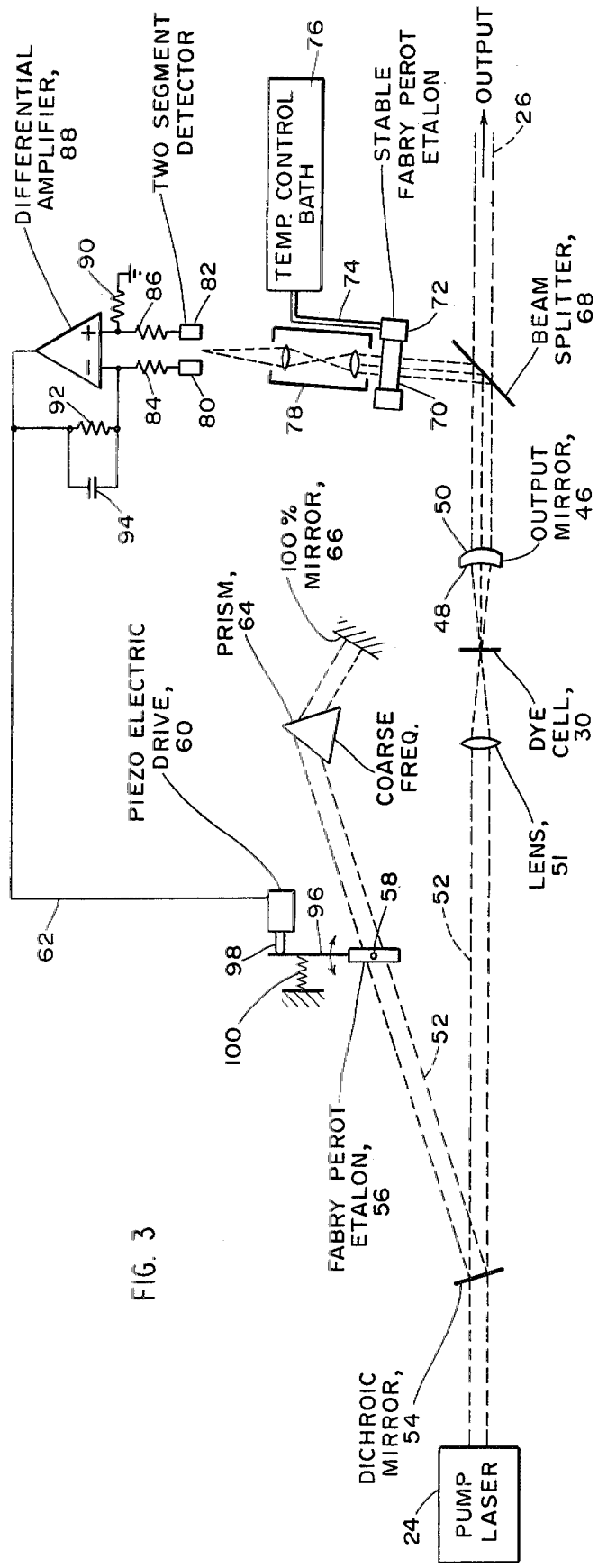
FIG. 3
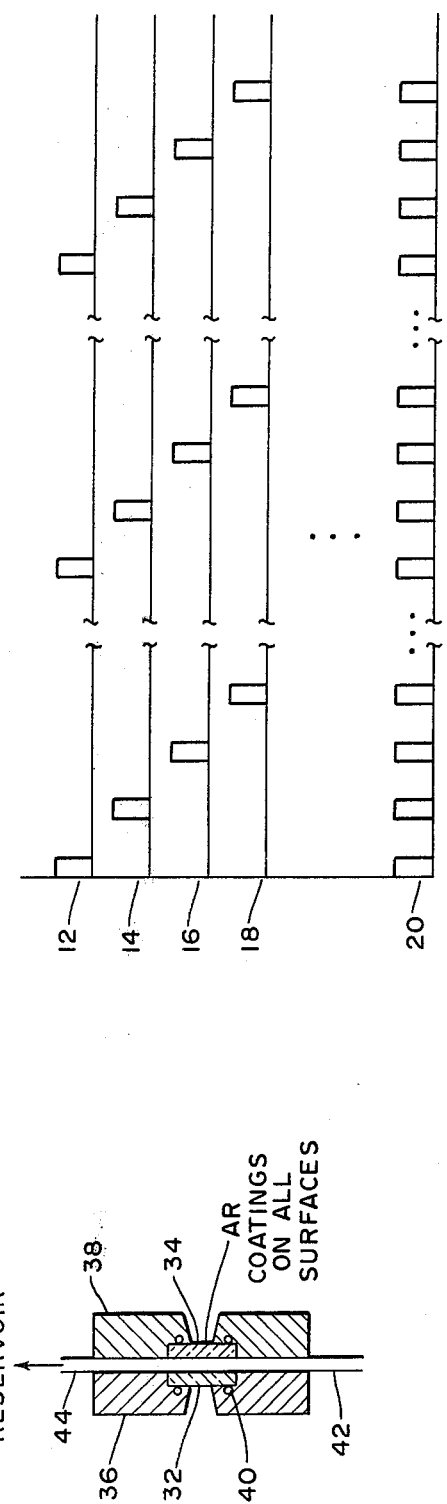
FIG. 1
FIG. 4

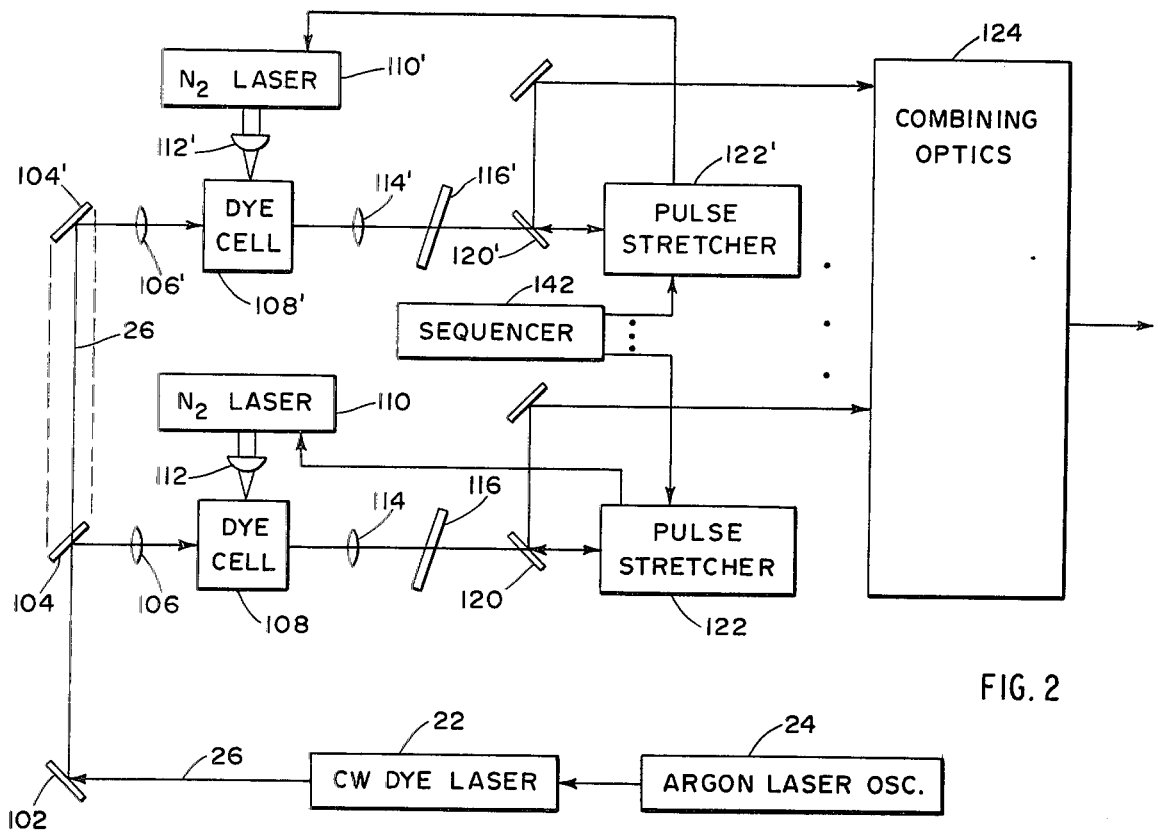
FIG. 2
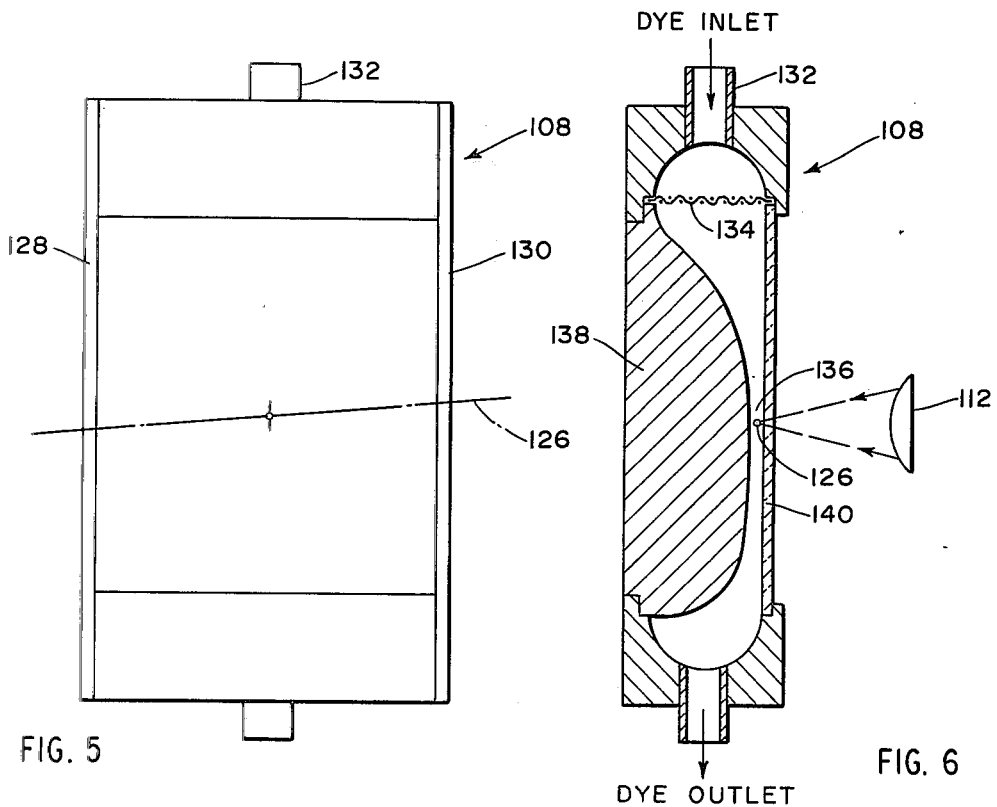
FIG. 5
FIG. 6

LASER AMPLIFIER SYSTEM

FIELD OF THE INVENTION

This invention relates to laser amplifier systems and in particular to a system having plural, parallel paths of laser amplification of radiation from a single laser oscillator.

BACKGROUND OF THE INVENTION

In the technique of laser enrichment as shown, for example, in U.S. Pat. No. 3,772,519, or patent applications, Ser. No. 328,954, filed Feb. 2, 1973 and Ser. No. 469,407, filed May 13, 1974, all assigned to the same assignee as the present application and all incorporated herein by reference, pulsed laser radiation is employed for isotopically selective excitation of a uranium vapor flow. In order to provide an increased pulse rate in the applied laser radiation for greater system efficiency, it has been suggested, as for example shown in copending U.S. Pat. application Ser. No. 438,029, filed Jan. 30, 1974, assigned to the same assignee as the present application and incorporated herein by reference, to employ a system of rotating optics to combine a time sequence of radiation pulses from a plurality of radiation paths onto a single combined path of radiation of increased pulse repetition rate. For use in this system, apparatus is desired for generating plural channels of pulsed laser radiation with the pulses for each channel related in a predetermined time pattern, and with well maintained stability and spectral consistency in the laser radiation of each channel so that the combined beam is suitable for efficient, isotopically selective photoexcitation.

BRIEF SUMMARY OF THE INVENTION

In accordance with a preferred embodiment for the present invention a system is disclosed for generating a plurality of separate paths of pulsed laser radiation of suitable high intensity and spectral purity for efficient laser enrichment. In the disclosure of the preferred embodiment, a single, low power, pulsed or continuous dye laser is employed having an output beam of stabilized laser radiation which encompasses an absorption line for one isotope in the irradiated environment without correspondingly encompassing an absorption line for any other isotope type. The stabilized laser oscillator output is injected in parallel into a plurality of transverse pumped dye cell amplifiers which amplify at the frequency of the laser oscillator. The amplifiers include an elongated region of transversely pumped dye solution of small cross-sectional area for increased amplification. The transverse pumped dye cell is kept free of frequency determining elements, as well as feedback reflections so as not to impart any frequency change or instability in the amplification length of the dye cell that would otherwise destroy the spectral homogeneity imparted by the use of the single laser oscillator.

The plural dye cells in the parallel laser amplication paths are pulse excited by plural pump lasers in such a sequence as to provide an equal spacing between pulses from each dye cell, but with the pulses from all other dye cells staggered so as to permit subsequent optical combining of the pulses from the plural dye cells into a beam of combined laser pulses of equal pulse spacing and augmented pulse repetition rate.

In advance of the application of the pulses of amplified laser radiation from each dye cell to the beam combining optics, each amplified pulse may be elongated in duration for maximum efficiency of the enrichment system.

BRIEF DESCRIPTION OF THE DRAWING

These and other features of the present invention are more fully set forth below in a preferred embodiment of the present invention, presented for purposes of illustration and not by way of limitation, and in the accompanying drawing of which:

FIG. 1 is a waveform timing diagram useful in understanding the invention;

FIG. 2 is a system diagram of the laser amplification system according to the present invention;

FIGS. 3 and 4 are diagrams of a stabilized laser oscillator for use in the invention;

FIGS. 5 and 6 are orthogonal views of one of the plurality of dye cell amplifiers for use in the present invention;

DETAILED DESCRIPTION OF THE PREFERRED EMBODIMENT

Figure 7:
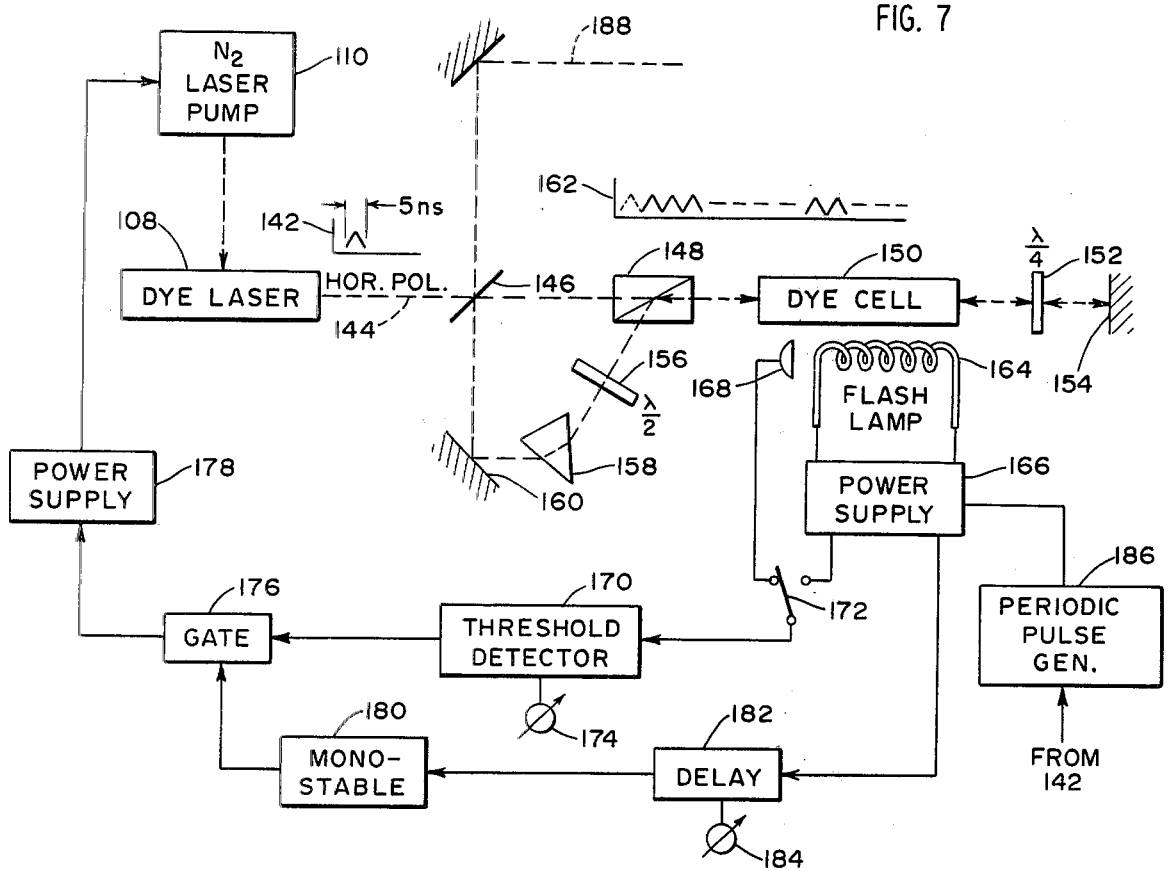
FIG. 7 is a diagram of a laser pulse elongation system which may be used in the present invention.

The present invention contemplates a system for providing a plurality of laser beams of pulsed laser radiation with an intensity, stability and consistent spectral content for isotopically selective excitation of particles in a flowing environment. The plural beams of pulsed laser radiation are combined to permit the realization of a higher pulse rate for more complete excitation of the particles in the flowing environment.

The time pattern of pulses in the plural separate and single combined paths may best be understood with reference to FIG. 1, showing a laser pulse timing diagram. Plural beams of laser pulses of up to a significant fraction of a microsecond duration are illustrated in waveforms 12, 14, 16 and 18, as are produced by each of the plurality of laser amplifiers in the present invention. The pulses from each amplifier as shown in waveforms 12–18 are combined to provide a composite output beam as illustrated by waveform 20 which consists of a series of equally spaced laser pulses at a repetition rate greater than the rate for any of the individual amplifiers 12–18 by a factor equal to the number of separate amplifier paths. Using the optical combining technique illustrated in the above-referenced U.S. Pat. application Ser. No. 438,029, it is possible to achieve repetition rates in the composite output beam as illustrated in waveform 20 in several tens of $KH_z$ which is desired for efficient isotope separation in uranium enrichment.

The combined beam illustrated by waveform 20 will require that each of the pulses have essentially the same spectral characteristics, i.e., stability, center frequency and frequency spread, to insure a highly effective isotopically selective excitation is achieved with the laser radiation from the combined beam. Accordingly, it is necessary that small frequency shifts or other perturbations not occur in the plural amplifier channels required for producing the series of separate amplified pulses illustrated by waveform diagrams 12, 14, 16 and 18.

Apparatus for insuring this spectral homogeneity is illustrated with respect to FIG. 2 which is a system diagram of a laser oscillator and plural parallel amplifier systems for developing a set of amplified laser radiation beams of the type illustrated in waveform diagrams 12–18 and of further apparatus for lengthening pulse duration and for combining pulse paths to achieve the composite beam of pulses illustrated by waveform 20.

As shown in FIG. 2, a CW dye laser oscillator 22 is excited by an argon laser 24, typically for continuous laser beam generation at a precisely defined frequency and bandwidth for isotopically selective excitation of the uranium U-235 isotope. A frequency in the red-orange portion of the visible spectrum is typically selected for the output frequency of this oscillator in the case where three energy steps of isotopically selective photoexcitation is desired. The FIG. 2 type system may be used for any one or more of the energy steps. The argon excitation oscillator 24 may be a Spectra-Physics Model 165 or Model 170 depending upon power requirements.

The CW dye laser oscillator 22 will typically have an output power of approximately 10–100 mw. per channel of laser amplification to which it is applied. While it is preferable to employ a CW dye laser for the master oscillator 22, other lasers may be employed including pulsed lasers which have an output pulse rate at least corresponding to that illustrated in waveform 20.

From the CW dye laser 22 an output beam 26 is provided which has a highly stabilized accurate spectral characteristic. A specific, stabilized dye laser for the oscillator 22 may be as shown in copending U.S. Pat. application Ser. No. 434,078, filed Jan. 17, 1974 ; assigned to the same assignee as the present application and incorporated herein by reference. The details of such a system are illustrated with respect to FIGS. 3 and 4, and include, typically, a tunable dye laser and cavity along with a feedback stabilization system for the laser radiation. In particular, a dye cell 30 contains a dye solution which forms the lasing medium and is associated with a cavity and tuning means to control the lasing frequency. The dye cell 30 is illustrated in greater detail in FIG. 4 and is shown to comprise first and second cell windows 32 and 34 having anti-reflective coatings thereon at the frequency of the desired laser radiation and held together through compression plates 36 and 38 and 0 ring seals 40. The dye solution used in the dye cell 30 as the lasing medium enters and exits the region between plates 32 and 34 in a continuous flow from a pump to a reservoir, not shown, through respective conduits 42 and 44.

Referring to FIG. 3, the lasing cavity in addition to dye cell 30 includes an output mirror 46 having a partially reflective concave surface 48 and a convex exterior lens 50 for divergence control on the laser beam. On the other side of cell 30, a lens 51 is also provided in the laser beam path to recollimate the radiation from cell 30 onto path 52 for reflection through the cavity. A dichroic mirror 54 is placed in the cavity and reflects the recollimated radiation through a controlled Fabry Perot etalon filter 56 which may typically be pivoted about a central axis 58 and rotationally controlled by a piezoelectric element 60 in response to a signal on a line 62. The Fabry Perot filter typically comprises a set of fused silica windows placed parallel to define a cavity, with transmissivity increasing at cavity resonance points. the radiation passing through the Fabry Perot filter 56 will be fine tuned in frequency in correspondence with the angle of the etalon filter 56 as explained below. The cavity further includes a prism 64 on the far side of filter 56 and a fully reflecting mirror 66 which together provide a coarse frequency definition of the laser radiation from the dye cell 30.

Excitation radiation to invert the energy state populations in the dye in cell 12 to a lasing condition is provided from the argon laser 24 through dichoric mirror 54 onto path 52. The superimposed argon laser radiation excites the dye medium in cell 30 to an excited energy condition. The particular transition to a narrow range of one or more lower level states is defined by the frequency to which the cavity is tuned, typically chosen to correspond to U-235 isotope absorption line for uranium enrichment. In accordance with this system, the lasing frequency will be narrowly defined and correspond to a particular absorption line for the desired isotope without correspondingly encompassing a neighboring absorption line for other isotope types. Appropriate uranium absorption lines for this purpose may be selected from published tabulations or basic spectroscopy in the red to orange portion of the visible sepctrum. Typically, the difference between absorption lines fot the U-235 and U-238 isotopes in this portion of the visible spectrum may be as little as a fraction of a wave number ($cm^{-1}$).

A beam splitter 68 samples a portion, typically a small percentage, of the radiation in the output beam 26 and directs it through a stable Fabry Perot etalon filter 70. Filter 70 has a temperature control jacket 72 fed through tubing 74 from a temperature control bath 76. The bath is regulated to control the etalon filter temperature to within preferably a 0.1° centigrade. temperature variation.

The etalon filter 70 will typically include a spacer between filter mirrors or, generally, windows. The spacer is preferably formed of an ultra low expansion titanium silicate which may be commercially obtained with an expansion coefficient of approximately $3 \times 10^{-8}/°$ C at room temperature. Where temperature control of 0.1° C is achieved, stability is better than one part in $10^8$ or $6 \times 10^{-5}$ angstroms in the approximate range of 6,000 angstroms.

The sampled radiation after passing through the etalon produces an interference pattern when imaged by a telescope 78 to a focus between a pair of photodetectors 80 and 82.

The Fabry Perot etalon filter 70 provides maximum transmissivity at the frequency and transmission angle for which an integral number of half wavelengths fit between the filter windows. Accordingly, several discrete angles will provide maximum transmissivity at any given frequency leading to a pattern of rings. As the frequency of incident radiation is varied, the position of rings will change radially due to different discrete angles at which maximum transmissivity occurs. The field of view of the lens 78 selects a short line section, a spot, of one ring to focus to a point between photodetectors 80 and 82. Typically, the photodetectors are separated along a radial line of the pattern of rings.

The output of the detectors 80 and 82 is applied through respective input resistors 84 and 86 to inverting and noninverting inputs of a differential amplifier 88 which may include one or more stages of amplification. The noninverting input is biased to ground through a resistor 90 while the inverting input receives a further signal from a feedback path consisting of a gain determining resistor 92 in parallel with a frequency stabilizing capacitor 94.

The output of the amplifier 88 is applied to the piezoelectric drive mechanism 60 on line 62. A pivot arm 96 on the etalon filter 58 is directed against a mechanical output shaft 98 from the piezoelectric drive 60 and may be resiliently urged against it by a spring 100. This feedback control over the angle of filter 58 provides the desired frequency stabilization for the output beam 26 applied throughout the system shown in FIG. 2.

Returning now to FIG. 2, the output beam 26 from the CW dye laser 22 is reflected by a mirror 102 to a first beam splitter 104 which directs a portion of the radiation in beam 26 through a lens 106 to a dye cell 108 acting as a nonresonant laser amplifier. The dye cell 108 is pulse excited by radiation pulses from a nitrogen laser 110 through a cylindrical focusing lens 112 which provides transverse pulse excitation of an elongated region of dye medium in the cell 108. The pulse amplified beam of laser radiation from the dye cell 108 is applied through a lens 114, an optional filter 116, for limiting the super-radiance in the output beam 118 from the dye cell 108, to a beam splitter 120 which forms a part of a pulse stretcher 122 as illustrated in U.S. Pat. application Ser. No. 360,176, filed May 14, 1973, and U.S. Pat. application Ser. No. 360,178, filed May 14, 1973, both assigned to the same assignee as the present application and both incorporated herein by reference. The elongated pulse of radiation in the beam 18 is reflected from beam splitter 120 and applied to a combining optics system 124 as illustrated in above-referenced United States patent application Ser. No. 438,029.

Additional laser amplification channels receive further radiation from the beam 26 as illustrated with beam splitter 104', lens 106' and other components generally identical to those described below and identified with primes in the drawing of FIG. 2. As many separate, parallel channels of laser amplification may be employed as it is desired or necessary to combine by the combining optics 124 in order to achieve the desired pulse repetition rate and as is permitted by the available power in the output beam 26 from the CW dye laser 22.

The lenses 106 or 106' focus the radiation in the beam 26 to a narrow cross-section in the elongated region of the dye cell 108. To show this more clearly, dye cell 108 is illustrated in detail in FIGS. 5 and 6. With respect to FIG. 5, the dye cell is shown having a laser beam path 126 between glass side windows 128 and 130. The laser path 126 is angled to the windows 128 and 130 to prevent radiation reflections that could affect the frequency stability of the amplified radiation. As shown in cross-section in FIG. 6, the laser parth 126 is a small area corresponding to approximately 1 mm$^2$. The lens 106 focuses the radiation derived from beam 26 to this small cross-sectional area to enhance the amplification effect with a smaller excited area of radiation. Similarly, the cylindrical lens 112 focuses the pulsed excitation from the nitrogen laser 110 to a correspondingly small cross-sectional area of excited radiation approximately 0.1 mm by 1.0 mm. The length of the laser path 126 is typically 5 centimeters, different lengths being usable depending upon the desired amplification. Typically, the 5 centimeter length will produce an output pulse of several nanoseconds duration and 5 kw. peak power for use in laser enrichment. Since there are no reflective elements to define a cavity for the dye cell 108, there will be no effect upon the highly stable radiation from the CW dye cell 22 in passing through the dye cell 108 other than amplification.

The physical construction of the dye cell 108 is illustrated in FIGS. 5 and 6 wherein the path for the flowing dye is shown to traverse the cell from an inlet 132 through a turbulence and bubble impeding screen 134 into a constricted passage 136 wherein the laser path 126 lies. A rear member 138 forming the rear wall of the constricted area 136 is preferably optically reflective, while the opposing wall 140 is a quartz window for admitting the radiation excitation pulses from the nitrogen laser 110.

Returning to FIG. 2, a sequencer 142 is illustrated which provides trigger pulses for the pulse stretchers 122...122' which in turn activates lasers 110...110' to produce pulsed excitation of the dye cells 108...108' in the sequence illustrated in waveform diagrams 12–18 in FIG. 1.

The pulse stretcher 122 is more particularly described in the above-referenced United States patent application Ser. No. 360,178, while the combining optics 124 are more fully described with respect to the United States patent application Ser. No. 438,029, assigned to the same assignee as the present application.

In the pulse stretchers as shown in FIG. 7, the output pulse 144 from the dye laser 108 shown representatively in graph 142 as a short duration, five nanosecond pulse, preferably has a narrow spectral range. The output beam 144 is suitably oriented by placement of the laser 108 to be horizontally polarized and applied to a beam splitter 146. The majority of the radiation in the beam 144 passes through the beam splitter to a Glan-Thompson polarizing crystal 148 which is oriented to pass the radiation in beam 144 to a dye cell 150. The cell 150 provides laser amplification. The beam 144 after passing through the dye cell 150 is applied through a quarter wavelength retardation plate 152 which typically converts the horizontal polarization to circular. The beam is subsequently reflected by a 100 percent reflecting mirror 154 and returned through the quarter wavelength retardation plate 152 to the dye cell 150 for a second amplification. At this point, the radiation will have been shifted in polarization by 90° and upon leaving the dye cell 150 after the second amplification will be reflected by the Glan-Thompson polarizing crystal 148. This reflected wave is applied to a half wavelength retardation plate 156 to restore the horizontal polarization. The horizontally polarized beam may then be applied to a Brewster angle prism 158 to provide additional frequency selectivity. The beam leaving the prism 158 is applied to a 100 percent reflecting mirror 160 which directs it back toward the beam splitter 146. The beam splitter 146 is typically chosen to have a reflectivity for the radiation from mirror 160 so as to return a predetermined portion of that radiation to the dye cell 150 through the crystal 148 in a regenerative loop. The predetermined portion is preferably chosen to be equal to the reciprocal of the amplification of the beam in its multiple passes through the dye cell 150. Additionally, the optical path for the beam 144 in making the round trip from the beam splitter 146 through the dye cell 150 back to the beam splitter 146 from the mirror 160 is preferably selected to be at least equal to the width of the pulse such that the predetermined portion reflected by the mirror 146 is reapplied to the dye cell 150 directly after the previous pulse to produce a continuous sequence of equal amplitude pulses as shown in graph 162. The configuration shown permits extraction of the amplified pulses from the laser amplifier in isolation from the input radiation such that no output radiation is reapplied to the laser 108 to disturb its operation. The duration of the sequence of pulses will be determined by the period during which the dye cell 150 is maintained in a lasing condition.

For this purpose, the dye cell 150 is excited to a lasing condition by creating a population inversion in the dye molecules through the application of excitation energy from a flashlamp 164. The flashlamp 164 is activated by a power supply 166. To provide proper synchronization between the activation of the power supply 166 and resulting excitation radiation from flashlamp 164 and the triggering of the nitrogen laser 110 for dye cell 108, a photo diode 168 is provided to detect excitation illumination from the flashlamp 164 and apply it to a threshold detector 170. Optionally, a signal representing the current applied to the flashlamp 164 may be selected by a switch 172 for application to the threshold detector 170 instead of the signal from the photodetector 168. The threshold detector 170 is adjustable by a control 174 to provide an output signal through a gate 176 at a predetermined amplitude in the sensed photodetector signal or flashlamp current. The gate 176 is, in the preferred embodiment of the invention, opened to conduct the signal from the threshold detector 170 to activate a power supply 178 for laser 110, only for a short interval defined by a monostable circuit 180. The monostable circuit 180 is triggered by a delay circuit 182 whose delay is varied by a control 184. The delay circuit 182 responds to a flashlamp activation signal from the supply power 166, and accordingly the gate 176 is opened only for a short period directly subsequent to the energizing of the flashlamp 40. A pulse generator 186, triggered by sequencer 142, may be used to provide the periodic activation of power supply 166 to generate pulses at a predetermined repetition rate and timing as shown in FIG. 1.

The adjustment of the threshold detector 170 is preferably such that the pulse of radiation in the beam 144 is applied to the dye cell 150 at a point when sufficient energy has been applied to the dye cell to provide laser amplification but before a self oscillating condition for the dye cell 150 has been created. This maintains the spectral purity for the exemplary application of selective isotope absorption. Additional tuning elements may be inserted in the laser beam path as found desirable.

Figure 8:
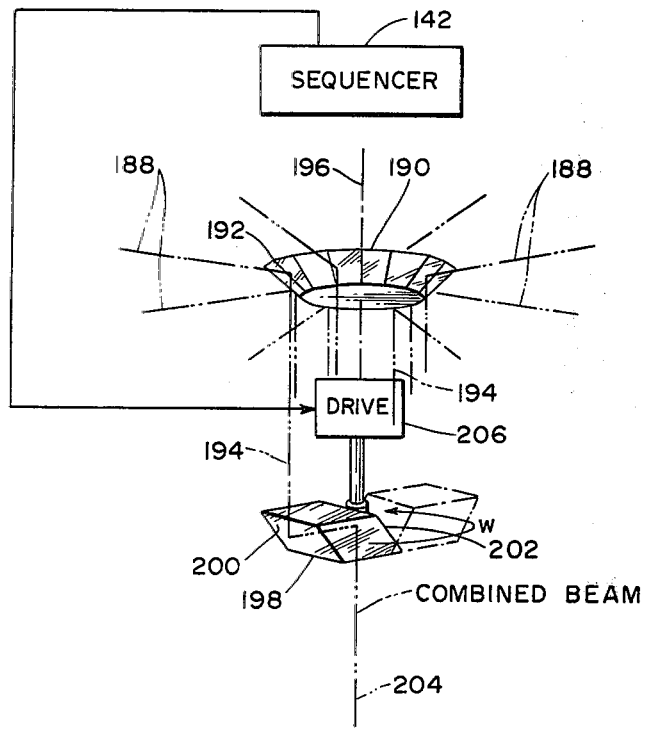
FIG. 8 is a diagram of an optical laser beam combining system for use in the invention.

A typical combining system is illustrated in FIG. 8, wherein a radial array of laser beams 188 from pulse stretchers 122...122' are directed towards a central point. Surrounding that central point is an array 190 of stationary mirrors 192 which are angled at 45° to reflect each sequential pulse of radiation from the laser beams 188 onto plural paths 194 coaxial to a central axis 196 for the mirror array 190. Each path is equidistant from the axis 196 and equally spaced around an imaginary cylinder about that axis. The array 190 is a convenience for laser placement. It is to be understood that any other system or arrangement which provides cylindrical or conical symmetry in the laser beam path is equivalently usable.

The radiation in the paths 194 is applied to a rotating solid rhombic prism 198 which has first and second parallel reflecting surfaces 200 and 202 on opposite edges. The first reflecting surface 200 is oriented to intercept each pulse of radiation from reflecting surfaces 192. The axis of rotation for the rhombus 198 is coincident with the axis 196 and passes through the second reflecting surface 202. A common axis output beam path 204 is provided after reflection of the input beam from surfaces 200 and 202. A drive system 206 for the rhombic prism 198 is controlled by sequencer 142 to insure each pulse of radiation from each reflecting surface 192 is appropriately timed to be centered upon the first reflecting surface 200 in the rhombic prism 198. The resulting pulsed beam on axis 204 as shown in waveform 20 in FIG. 1 has an increased repetition rate while maintaining spectral purity and stability in the radiation of each pulse.

Having described above the preferred embodiment of the present invention, it will occur to those skilled in the art that other apparatus may be employed in practicing the present invention without departing from its spirit and scope. It is accordingly intended to limit the scope of the invention only as indicated in the following claims.

What is claimed is:

1. A laser amplifier system comprising:
   a laser oscillator stabilized in frequency of radiation output;
   a plurality of laser amplifier channels;
   means for distributing laser radiation from said laser oscillator to each of said plurality of laser amplifier channels in parallel; and
   means for sequential pulse activation of each of the laser amplifier channels, said sequential pulse activation means including means for providing repeated sequential activation, thereby resulting in a series of laser output pulses, which series includes a plurality of pulses from each laser amplifier channel.

2. The laser amplifier system of claim 1 wherein said means for sequential pulse activation of each of the plural channels of laser amplification produces an equal interval between pulses produced by each individual channel and within such interval produces pulses from each of the channels of laser amplification evenly distributed throughout the interval.

3. The laser amplifier system of claim 2 further including means for combining the pulses of laser radiation from each of the channels of laser amplification into a composite beam of augmented pulse repetition rate.

4. An Apparatus for separating a uranium isotope from a vapor containing a plurality of uranium isotopes, including the laser amplifier system of claim 3 and further including means responsive to the composite beam for producing isotopically selective photoexcitation of one of the uranium isotopes present in the vapor.

5. The laser amplifier system of claim 4 further including means for lengthening the duration of each pulse of radiation in the pulses provided by the channels of laser amplification.

6. The laser amplifier system of claim 5 in which the laser oscillator is stabilized by a feedback control loop comprising:
   means for sampling the laser oscillator radiation;
   means for producing a control signal dependent upon the frequency of the sampled laser oscillator radiation; and means responsive to the control signal for adjusting the frequency of the laser oscillator to a desired frequency.

7. The laser amplifier system of claim wherein each of said plurality of laser amplifier channels includes a transverse pumped laser amplifier.

8. The laser amplifier system of claim 7 wherein said transverse pumped laser amplifiers include reflecting interfaces which are at other than right angles to the path through the transverse pumped laser amplifier of the laser oscillator radiation to prevent alteration of lasing radiation frequency caused by reflections from the reflective interfaces.

9. The laser amplifier system of claim 7 wherein said plurality of laser amplifier channels further include:
   an excitation laser;
   a dye cell including an elongate dye channel having a small, cross-sectional area;
   means for focusing radiation from said excitation laser onto the elongate, small cross-sectional area of said dye cell.

10. The laser amplifier system of claim 1 wherein said laser oscillator includes a continuous wave laser oscillator.

11. The laser amplifier system of claim 1 wherein:
    said laser amplifier channels include means for providing pulses of amplified laser oscillator radiation; and
    said laser oscillator includes a pulsed laser oscillator having means for providing a pulse rate thereto substantially higher than that of pulses provided in each channel of laser amplification.

12. The laser amplifier system of claim 1 wherein said laser oscillator is a low power, high stability laser oscillator tuned for isotopically selective excitation of a uranium isotope.

13. The laser amplification system of claim 1 wherein the radiation output of said laser oscillator is approximately 0.01 to 0.1 watts per amplification channel.

14. The laser amplification system of claim 13 wherein said plurality of laser amplification channels include means for providing pulsed laser output radiation of at least approximately 5 kw. peak power.

15. The laser amplification system of claim 1 further including means responsive to laser radiation from said plurality of laser amplification channels for combining the radiation thereof onto a single path.

16. The laser amplification system of claim 1 wherein said plurality of laser amplifier channels include:
    an elongate, transverse pumped, active lasing region having an area of narrow cross-section to which said laser oscillator radiation is applied;
    means for condensing the laser radiation from said laser oscillator to the narrow cross-section of said transverse pumped, active lasing region; and
    means for collimating amplified laser radiation from said transverse pumped active lasing region.

17. A laser amplification system comprising:
    a CW dye laser oscillator providing output laser radiation tuned for isotopically selective excitation of a uranium isotope;
    a plurality of laser amplifiers having an elongate, small cross-sectional area transversely pumped region of laser amplification;
    means for directing laser radiation from said CW dye laser oscillator in parallel through each of said elongate laser amplification regions;
    a source of pulse excitation for transverse application thereof to the elongate region of laser amplification whereby a plurality of pulses of amplified laser radiation from said CW dye laser oscillator are provided by each of said plurality of elongate laser amplification regions;
    the pulses from said regions being in a staggered time sequence;
    means responsive to the amplified pulses of laser radiation from each of said elongate laser amplification regions to provide an increase in the duration of the laser radiation pulses; and
    means responsive to the elongated pulses of laser radiation from each of said elongate laser amplification regions to combine the pulses thereof onto a single path for laser radiation of augmented pulse rate.

18. A laser system for generating a high pulse repetition rate beam of pulsed laser radiation of high spectral purity and limited spectral width comprising:
    a CW dye laser providing output laser radiation tuned for isotopically selective excitation of a uranium isotope;
    a feedback system for said CW dye laser to adjust the tuning thereof to provide a stable frequency of output laser radiation at an absorption frequency for said uranium isotope without correspondingly encompassing an absorption line for another isotope of uranium;
    a plurality of laser amplifiers;
    means for directing laser radiation from said CW dye laser oscillator in parallel through each of said plurality of laser amplifiers;
    a source of pulse excitation for each of said plurality of laser amplifiers to provide at the output of each of said plurality of laser amplifiers a beam of amplified pulsed laser radiation;
    means for sequencing the pulse timing of the pulses in the beams from said plurality of laser amplifiers to provide an equal interval between pulses from each individual laser amplifier and within the interval between each pulse thereof providing a pulse from each of the other of said plurality of laser amplifiers evenly distributed throughout said interval;
    means responsive to the amplified pulses of laser radiation from each of said plurality of laser amplifiers for adding to each pulse of said beam a plurality of additional, like pulses to provide a sequence of adjacent pulses with the effect of elongating each of the pulses from said plurality of laser amplifiers; and
    a rotating optical system sequenced to receive each of the elongated pulses from each of said plurality of laser amplifiers on separate input paths and to redirect said pulses only a single output path to provide a composite beam of augmented pulse rate.

19. A laser amplifying method comprising the steps of:
    generating laser oscillation stabilized in frequency of radiation output;
    distributing the laser oscillation to each of a plurality of laser amplifier channels arranged in parallel;
    sequentially activating each of the laser amplifier channels to produce an output pulse of laser amplified radiation; and repeating the above steps to provide a continuous series of laser output pulses, which series include a plurality of pulses from each of the laser amplifier channels.

20. A laser amplifier system comprising:

a laser oscillator stabilized in frequency of radiation output;

a plurality of laser amplifier channels, including means for providing pulses of amplified oscillator laser radiation and means for elongating the duration of the pulses of amplified laser radiation; and means for distributing laser radiation from said laser oscillator to each of said plurality of laser amplifier channels in parallel.

21. A laser amplifier system comprising:

a laser oscillator stabilized in frequency of radiation output and including an argon laser excitation source and a continuous wave dye laser;

a plurality of laser amplifier channels; and means for distributing laser radiation from said laser oscillator to each of said plurality of laser amplifier channels in parallel.

* * * * *

UNITED STATES PATENT AND TRADEMARK OFFICE
CERTIFICATE OF CORRECTION

PATENT NO. : 3,944,947
DATED : March 16, 1976
INVENTOR(S) : Charles T. Pike and Richard H. Levy It is certified that error appears in the above-identified patent and that said Letters Patent are hereby corrected as shown below:

Column 3, line 47, "and O ring" should read -- and "O" ring --

Signed and Sealed this

Twenty-first Day of September 1976

[SEAL]

Attest:

RUTH C. MASON
*Attesting Officer*

C. MARSHALL DANN
*Commissioner of Patents and Trademarks*